United States Patent Office 2,958,220
Patented Nov. 1, 1960

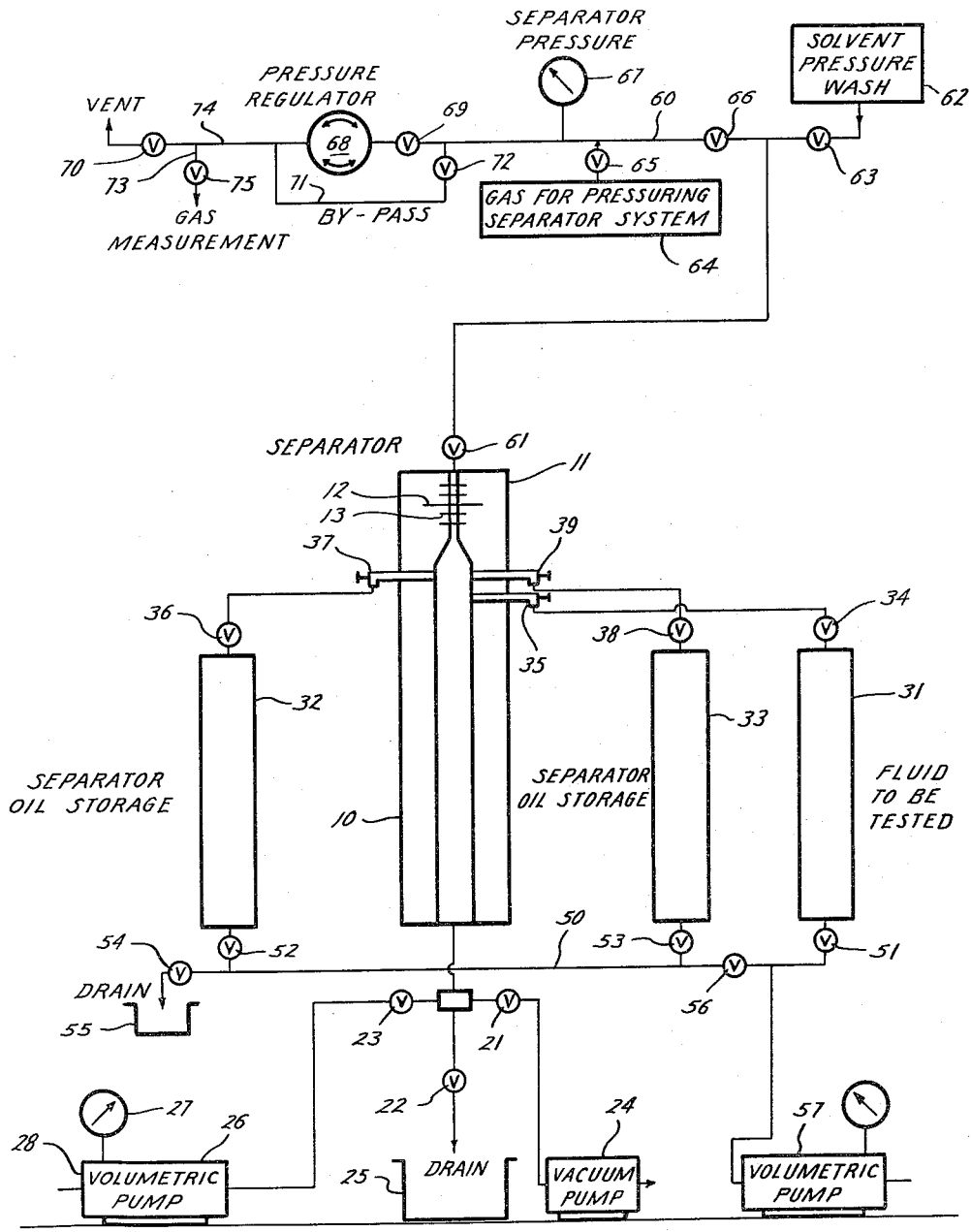

2,958,220

TEST SEPARATION OF GAS AND LIQUID

Paul J. Kalish, Houston, Tex., assignor to Ruska Instrument Corporation, Houston, Tex., a corporation of Texas Filed May 11, 1955, Ser. No. 507,635

14 Claims. (Cl. 73—53)

This invention pertains to gas-liquid separation and measurement and more particularly to small scale or laboratory apparatus and methods for flash separating gas and liquid hydrocarbons and measuring the quantities of fluid introduced into the separation vessel and the amount of liquid separated at different separation pressures.

The principal object of the invention is to provide laboratory apparatus for true flash separation whereby any desired number of stages of separation with measurement at each stage can be achieved using only the same apparatus needed for three stage separation.

Another important object of the invention is to provide apparatus and method of laboratory separation and measurement which will be both precise and accurate, precision here being used in the sense of capability of reproducing the same results under the same conditions, accuracy referring to the approach to the correct result at any given time.

A further object of the invention is the provision of a laboratory apparatus and method for multistage flash separation at any desired temperature as well as pressure.

Other objects and advantages of the invention will appear from the following description of a preferred embodiment of the invention, reference being made to the accompanying drawing showing a schematic representation of an apparatus according to the invention with which the methods of the invention can be performed.

Apparatus

Referring to the drawing, the apparatus comprises a thick walled transparent plastic tube 10 constituting a pressure vessel or zone capable of withstanding internal working pressure of at least 600 p.s.i. with a suitable factor of safety. Tube 10 has a capacity of about 40 cc. and has an upper portion 11 of small diameter accurately bored and provided with a principal reference line 12 and auxiliary reference lines 13 spaced at 5 mm. intervals coreresponding to volume increments of .010 cc. Tube portion 1 is thus a capillary, having a diameter of approximately 1.6 mm.

The lower end of separator 10 is connected through valves 21, 22, 23 respectively, to a vacuum pump 24, a receptacle for drainage 25, and a calibrated high pressure mercury displacement pump 26 having a pressure gage 27 for indicating pressure and a scale 28 for indicating volume. Such a mercury pump is described and shown in more detail in U.S. Patent 2,327,642—Horner—wherein is shown such a pump forming part of another apparatus.

Pressure vessels 31, 32, 33 are connected at their tops to pressure vessel 10 just below graduated portion 11 through pairs of valves 34—35, 36—37, 38—39 respectively. Valves 35, 37, and 39 are special valves which when closed leave no cavities adjacent the inner surface of tube 10 to trap gas or liquid.

The lower ends of vessels 31, 32, 33, which constitute storage zones, are connected to a common pipe 50 through valves 51, 52, 53 respectively. Pipe 50 is connected through valve 54 to a drainage receptacle 55. There is a valve 56 in pipe 50 between valves 51 and 53. A mercury pump 57 similar to pump 26 is connected to pipe 50 between valves 51 and 56.

The upper end of vessel 10 is connected to a pipe 60 through a valve 61. A source 62 of solvent under pressure, e.g. solvent propelled by compressed gas, is connected to pipe 60 through valve 63. A source 64 of gas under pressure, e.g. a tank of compressed gas is connected to pipe 60 through valve 65. There is a valve 66 in line 60 between the connections of the gas source 64 and vessel 10. A gage 67 indicates the pressure in pipe 60. A pressure regulator 68 is connected to pipe 60 through valve 69. The regulator is vented to atmosphere through valve 70. There is a by-pass 71 around regulator 68, the by-pass being controlled by valve 72. There is a branch pipe 73 from vent pipe 74 leading through valve 75 to a gas measuring apparatus (not shown) which may be of any conventional type.

Method—first stage separation

It will be assumed that all four pressure vessels have been washed with solvent under pressure from source 62 drained off into receptacles 25 and 55 and the vessels evacuated with pump 24. Vessel 31 with its valves 34 and 51 is then removed from the apparatus and charged with the fluid to be tested. Vessel 31 is then replaced in the separator apparatus and the line between valves 34 and 35 is purged, e.g. by admitting a little oil from vessel 31 and then rewashing and reevacuating vessel 10. Mercury is then pumped from pump 26 into vessel 10 up to index line 12 and with vessel 10 brought to first stage separation pressure with gas from source 64, scale 28 is read. The mercury is then wtihdrawn to the lower part of vessel 10 to provide space for the accumulation of liquid during the subsequent step of separation to be described later. Vessel 10 is then filled with gas from source 64 to a desired pressure at which the first stage of separation is to take place in vessel 10. Pressure is maintained constant at the desired pressure by regulator 68. The gas preferably is from the same source as the fluid being tested but may be a similar gas. For example, in the case of a sample of reservoir oil being tested, the gas may be either gas from the primary separator at the same well or may be natural gas from some other source. Indications are that the error due to use of gas from a source other than that same reservoir is negligible.

Valves 51 and 34 are then opened and mercury pump 57 is read with the pressure in vessel 31 at a selected pressure at least as high as saturation pressure and preferably at least slightly above and usually at reservoir pressure. Then at this same pressure a portion of the liquid is displaced from vessel 31 into vessel 10 through valve 35 by mercury from pump 57 which is operated to maintain reservoir pressure in vessel 31. The quantity of liquid displaced into vessel 10 is determined by the difference between the scale readings of the mercury pump before and after the displacement, both at the same pressure. If desired the scale can be set at zero before the displacement so that the final scale reading indicates directly the volume of liquid displaced. The liquid on entering separator vessel 10 is partially vaporized and tends to increase the pressure in vessel 10. Pressure is kept constant however, by the escape of gas through pipe 60 and regulator 68 to pipe 73. Equilibrium at the pressure of vessel 10 as determined by regulator 68 is established between liquid and gas phases. With valve 35 closed and the pressure in separator 10 kept at least as high as before by regulator 68 so that no further separation takes place, pump 26 is then operated to displace mercury into separator vessel 10 until the top of the liquid therein is at index mark 12. Then, with the pressure in separator 10 at the same pressure as during separation, the scale 28 is read to determine the volume of liquid in the separator. If index mark 12 is missed, the deviation is read from mark 13 and the error added to or subtracted from the volume shown by scale 28.

Second stage separation

Liquid from separation vessel 10 is then transferred to one of vessels 32 or 33, e.g. 32. It is not necessary that 100% of the liquid in vessel 10 be transferred to vessel 32, although in practice as much as possible will usually be transferred, in other words, a desired amount is removed. Vessel 32 has previously been filled with mercury from pump 57 and brought to the same pressure as vessel 10. Liquid in separator 10 is transferred to vessel 32 by displacing more mercury into the vessel 10 from pump 26. With valve 61 closed and valves 36 and 37 open, mercury is simultaneously withdrawn from the bottom of vessel 32 by pump 57, valve 51 being closed and valves 52 and 56 being open. The pressure is maintained at least as high as the first stage separation pressure during the transfer in order to prevent any further separation.

After the bulk of the liquid is removed from separator 10, valve 37 is closed and mercury and residual liquid is drained from vessel 10 through valve 22. Valve 23 is closed and separator 10 is then washed with solvent from source 62 and evacuated with pump 24. Pump 26 is then operated to displace mercury into separator vessel 10 up to mark 12 and scale 28 rezeroed or reread with vessel 10 at second stage separation or pressure. Mercury is then withdrawn to the lower part of vessel 10 as before.

With pressure regulator 68 set for a lower desired pressure at which the second stage of separation is to be accomplished a portion of the liquid from storage vessel 32 is displaced into vessel 10 by mercury from pump 57, the mercury pump being operated to maintain vessel 32 at a pressure at least as high, or preferably slightly higher, than first stage separation pressure. The quantity displaced into vessel 10 is equal to the difference in readings of the scale on pump 57 at the beginning and end of the displacement. The readings must be made at the same pressure in pump 57 and preferably are taken at the pressure of the preceding stage of separation. However, if the pump is read when the pressure is higher, e.g. at the same higher pressure at which it is operated during the charging operation, the result will be satisfactory as long as the pressure is the same at both the initial and final readings of the pump. The volume of charging liquid thus measured at the preceding separation pressure can be determined from that measured at the higher pressure, by suitable calculation, or instead, the results can be compensated by measuring the volume of the liquid separated at a pressure higher than the separation pressure by an equal number of pounds per square inch if the shrinkage of the liquid during separation is not too large, e.g. 5%. A measured portion of liquid from vessel 32 is thus flashed to a lower pressure in vessel 10 where there is second stage of liquid and gas separation. Mercury from pump 26 is then again displaced into vessel 10 until the top of the liquid is at index mark 12 and scale 28 read to determine the volume of liquid, the gas pressure being at this time the same as during the second stage of separation.

Additional stages of separation

Liquid separated out in vessel 10 after the second separation is transferred to vessel 33 at pressure at least as high as second stage pressure by means of pumps 26 and 57, the same as liquid was transferred from vessel 10 to vessel 32. Separator 10 and storage vessel 32 are then washed with solvent and evacuated. A third flash separation from vessel 33 to vessel 10 at a lower pressure can then be accomplished the same as from vessel 32 to vessel 10. After the liquid separated in vessel 10 is measured the liquid is transferred to vessel 32 and vessels 10 and 33 are washed. The process is continued alternating flashes from storage chambers 32 and 33 to vessel 10 until a final state at atmospheric or some other final pressure is accomplished. If desired only one or two stage separation may be carried out. After the separation is complete another portion of the liquid from vessel 31 can be run through the separator and as many runs can be made at various sets of pressures and various numbers of stages as desired.

Further discussion of apparatus

It is to be noted that vessel 31 is required in order that enough reservoir liquid can be stored to provide for several separation runs from the same sample without breaking any connections. Otherwise, vessel 31 could substitute for one of the vessels 32, 33. It is also to be noted that two storage chambers 32 and 33 are required in order that one and its connecting line to separator 10 may be thoroughly washed while liquid is stored in the other. The difficulty with using a single storage chamber would arise in attempting to completely clean the connection through valve 37 or 39 which could not be done readily with liquid stored in separator 10. Conceivably, in its simplest form, the apparatus would utilize only one storage vessel instead of the three shown at 31—33, but the arrangement shown is highly preferable.

It is also possible to operate the apparatus with but one mercury pump e.g. pump 57. In such case pipe 50 would be connected to the lower end of separator vessel 10 through a valve and the pump would alternately be used to displace liquid from vessels 31, 32, 33 into vessel 10 and to measure the liquid in vessel 10 and displace the liquid therefrom into vessel 32 or 33. In the latter instance mercury from vessel 32 or 33 would be removed through valve 54 and caught in receptacle 55, the valve being opened to only such a degree that separator pressure can be maintained with pump 57 during the transfer.

During each flash separation, valve 65 is closed so that only the gas flashed off will escape through pipe 60. Valve 70 can be closed and valve 75 open so that the gas will be sent to the gas measuring apparatus.

By-pass 71 is used when separator 10 is operated at atmospheric pressure.

By-pass 71 may also be used when it is desired to clean pipe 60.

Adjustment and maintenance of ambient temperature can easily be achieved by placing the separator in a fluid bath whose temperature is thermostatically controlled. The separator in this case would be made of steel with a glass window in order to provide good thermal conductivity and permit high working pressures at elevated temperatures.

Summarizing the method, it will be observed that there are a series of true flash separations each followed by a displacement type volume measurement of the separated liquid, and thereafter without further separation transfer of the liquid to a storage chamber so that the separation vessel can be washed preparatory to the next flash separation.

In each stage of separation the liquid to be separated is introduced into the separation vessel by displacing it with mercury, and the volume of liquid introduced is measured by measuring the volume of mercury used to displace the liquid being tested. Also, the separated liquid is transferred from the separation vessel to a storage vessel by displacing it with mercury. However, the reason that the apparatus is preferably termed a displacement separator is that the volume of liquid separated is measured by mercury displacement as distinguished from other apparatus in which the liquids separated are measured by collection in a graduated receptacle.

It may be noted here that the displacement type of measurement gives greater precision and accuracy than is attainable with measurement by collection of the liquid in a graduated separator vessel. The reasons for this are many. First of all it may be noted that in a graduate the variable amount of liquid which collects on the walls of the separator must run down and joint the main body of liquid and the variable amount that does not do so will not be measured. Secondly, the changes in pressure and temperature of a graduated separator will vary the volume between graduations. Both of these factors affect the precision as well as the accuracy since they are variable errors. Thirdly, the accuracy of a graduated separator depends on the uniformity of the bore as well as the accuracy of the calibrations. Also, the zero position of the scale must be determined if a separate graduated scale attached to the side of the receptacle is used. All these calibrations introduce errors. Fourthly, the meniscus will be of large diameter in a cilbrated volume or graduate type of separator, as distinguished from the very small diameter meniscus in the top of the displacement type separator. Therefore, if the oil being separated is dark or cloudy, it will be difficult to judge its level. Fifthly, the graduate type separator must use large volumes of liquid to achieve any accuracy in order to minimize the large inherent errors that are independent of the volume used, whereas the displacement separator is sufficiently accurate with much smaller volumes of liquid. The displacement separator operates readily with an average accuracy of ±0.01 cc., this being independent of the volume of liquid being measured. Experimental results have been reproduced with such precision while measuring liquid volumes of 0.6 cc.–1.3 cc.

While a preferred embodiment of the invention has been shown and described, many modifications thereof can be made by one skilled in the art without departing from the spirit of the invention and it is desired to protect by Letters Patent all forms of the invention falling within the scope of the following claims:

1. Test method of multistage flash gas-liquid fluid separation, comprising maintaining a separation zone at a lower pressure by volume and pressure controlled movement of an inert liquid into or out of said separation zone at its lower end and by venting the top of said separation zone to a controlled pressure source, maintaining a reservoir zone containing a supply of test fluid in liquid phase at a higher pressure by volume and pressure controlled movement of an inert liquid into or out of said reservoir zone at its lower end, introducing a quantity of said test fluid from said reservoir zone into said separation zone while maintaining said lower and higher pressures in said separation and reservoir zones, respectively, as described, measuring the volume of said test liquid remaining in said separation zone by venting the top of said separation zone at said lower pressure to said controlled pressure source and by volume and pressure controlled movement of said inert liquid into said separation zone until the upper surface of said remaining test liquid has reached a reference level at said vent, maintaining a storage zone at a pressure at least as high as said lower pressure by volume and pressure controled movement of an inert liquid into or out of said storage zone at its lower end, discontinuing venting said separation zone and transferring said remaining liquid therefrom into said storage zone while maintaining said pressures in said separation and storage zones as described, maintaining said separation zone at a still lower pressure by volume and pressure controlled movement of an inert liquid into or out of said separation zone at its lower end and by venting the top of said separation zone to said controlled pressure source, and introducing said remaining liquid into said separation zone from said storage zone while maintaining said storage zone and separation zone pressures as described.

2. Method according to claim 1, and in addition, measuring the volume of said test liquid still remaining in said separation zone at said still lower pressure by venting the top of said separation zone at said still lower pressure to said controlled pressure source and by volume and pressure controlled movement of said inert liquid into said separation zone until the upper surface of said still remaining test liquid has reached a reference level at said vent, maintaining a second storage zone at a pressure at least as high as said still lower pressure by volume and pressure controlled movement of an inert liquid into or out of said second storage zone at its lower end, discontinuing venting of said separation zone and transferring said still remaining liquid into said second storage zone while maintaining said second storage zone and separation zone pressures as described, maintaining said separation zone at an even lower pressure by volume and pressure controlled movement of an inert liquid into or out of said separation zone at its lower end and by venting the top of said separation zone to said controlled pressure source, and introducing said still remaining liquid into said separation zone from said second storage zone while maintaining said second storage zone and separation zone pressures as described.

3. Method according to claim 2, and in addition, successively reintroducing liquid remaining from the last flash separation into said separation zone maintained at successively lower pressures from said storage zone and second storage zone alternately, and measuring the remaining liquid from each successive flash separation as described.

4. Apparatus for test separation of gas from liquid comprising a separation vessel having a calibrated capillary extension of transparent material and valved extension of said capillary extension at the upper end thereof, a storage vessel having a valved connection between its upper end and the upper portion of said separation vessel below said capillary extension, a second storage vessel also having a valved connection between its upper end and the upper portion of said separation vessel below said capillary extension, volumetric means for introducing a measuring liquid in measured amount to the lower end of said separation vessel and to the lower end of each of said storage vessels for maintaining desired pressure in said separation and storage vessels and for adjusting gas and liquid volumes in said separation vessel and liquid volumes in said storage vessels.

5. The combination of claim 4 wherein said volumetric means for introducing a measuring liquid includes one volumetric mercury pump and valve controlled pipes leading therefrom to the lower ends of said storage vessels by which the pump can be connected alternately to deliver mercury to or from one or the other of the storage vessels as desired, and a second volumetric mercury pump and a valve controlled pipe leading therefrom to the lower end of the separation vessel by which mercury can be delivered to or from the separation vessel as desired.

6. The combination of claim 5 including a test fluid storage vessel having a valved connection between its upper end and the upper portion of said separation vessel below said capillary extension, valved pipes connecting the lower end of said test fluid storage vessel to said one volumetric mercury pump whereby mercury may also be delivered to or from said test fluid storage vessel and desired pressure maintained therein, and vacuum means having a valved pipe connection to the lower end of the separation vessel.

7. The combination of claim 4, said volumetric means for introducing a measuring liquid including a volumetric mercury pump and valve controlled pipes leading therefrom to the lower ends of said storage vessels and to the lower end of said separation vessel by which the pump can be connected alternately to deliver mercury to or from one or the other of said storage vessels or to or from said separation vessel as desired.

8. The combination of claim 6, including pressure regulated gas receiving means connected to said valved extension.

9. The combination of claim 8, including pressured solvent introduction means connected to said valved extension for solvent washing of said capillary extension, separation vessel and storage vessels.

10. Apparatus for test separation of gas from liquid comprising a separation vessel having a calibrated capillary extension of transparent material and a valved extension of said capillary extension at the upper end thereof, a storage vessel having a valved connection between its upper end and said separation vessel below said capillary extension, a second storage vessel also having a valved connection between its upper end and said separation vessel below said capillary extension, volumetric means for introducing a measuring liquid in measured amount to the lower end of said separation vessel and to the lower end of each of said storage vessels for maintaining desired pressure in said separation and storage vessels and for adjusting gas and liquid volumes in said separation vessel and liquid volumes in said storage vessels.

11. The combination of claim 10 wherein said volumetric means for introducing a measuring liquid includes one volumetric mercury pump and valve controlled pipes leading therefrom to the lower ends of said storage vessels by which the pump can be connected alternately to deliver mercury to or from one or the other of the storage vessels as desired, and a second volumetric mercury pump and a valve controlled pipe leading therefrom to the lower end of the separation vessel by which mercury can be delivered to or from the separation vessel as desired.

12. The combination of claim 11 including a test fluid storage vessel having a valved connection between its upper end and said separation vessel below said capillary extension, valved pipes connecting the lower end of said test fluid storage vessel to said one volumetric mercury pump whereby mercury may also be delivered to or from said test fluid storage vessel and desired pressure maintained therein, and vacuum means having a valved pipe connection to the lower end of the separation vessel.

13. The combination of claim 12, including pressure regulated gas receiving means connected to said valved extension.

14. The combination of claim 13, including pressured solvent introduction means connected to said valved extension for solvent washing of said capillary extension and separation vessel.

References Cited in the file of this patent

UNITED STATES PATENTS

| | | |
|---|---|---|
| 635,535 | Frerichs | Oct. 24, 1899 |
| 2,082,329 | Foran et al. | June 1, 1937 |
| 2,380,082 | Sloan | July 10, 1945 |
| 2,669,538 | Yuraske et al. | Feb. 16, 1954 |
| 2,671,342 | Kapff | Mar. 9, 1954 |